Figure 1:
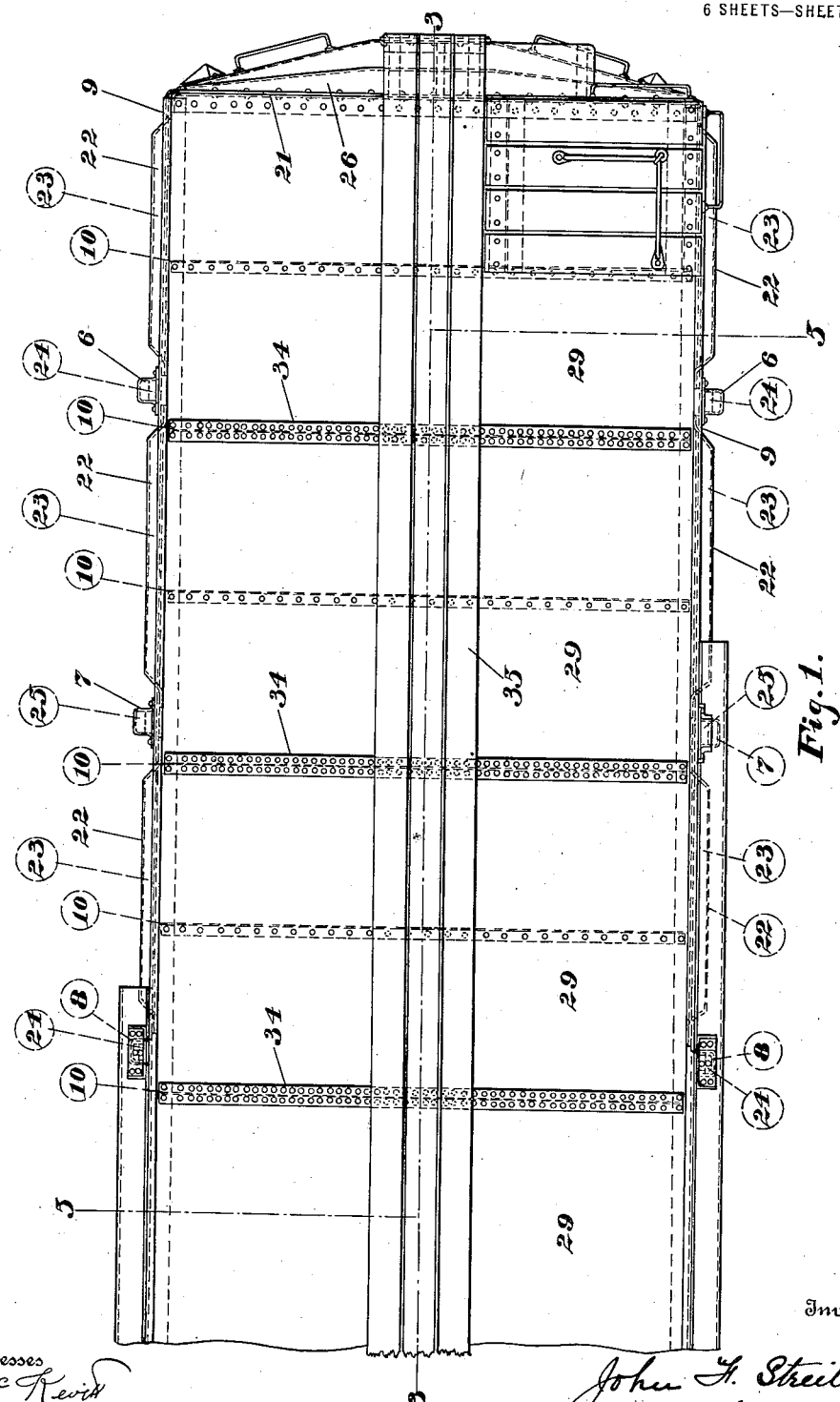

J. F. STREIB.
BOX CAR CONSTRUCTION.
APPLICATION FILED MAY 19, 1914.

1,203,432.

Patented Oct. 31, 1916.
6 SHEETS—SHEET 1.

Witnesses
J. McKevitt
Frank C. Miller

Inventor
John F. Streib,
By ......
Attorney

J. F. STREIB.
BOX CAR CONSTRUCTION.
APPLICATION FILED MAY 19, 1914.

1,203,432.

Patented Oct. 31, 1916.
6 SHEETS—SHEET 2.

J. F. STREIB.
BOX CAR CONSTRUCTION.
APPLICATION FILED MAY 19, 1914.
1,203,432.
Patented Oct. 31, 1916.
6 SHEETS—SHEET 6.
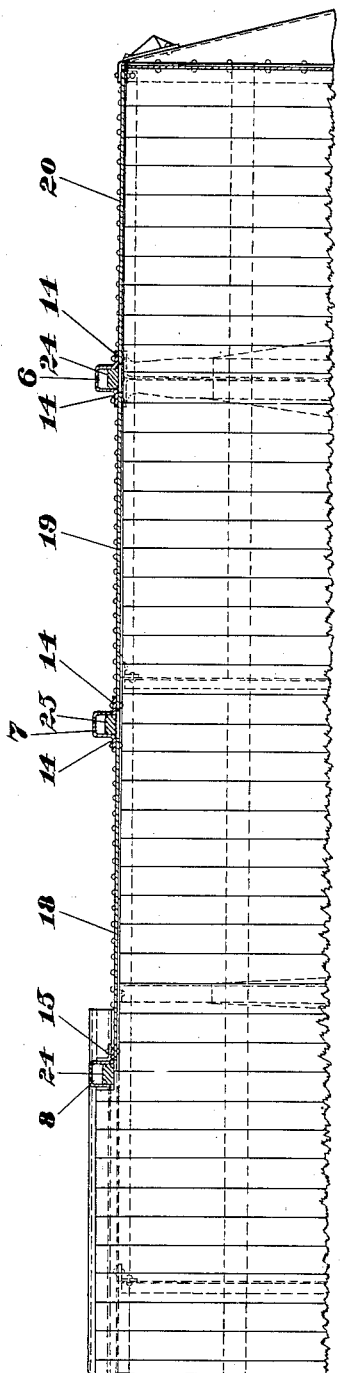
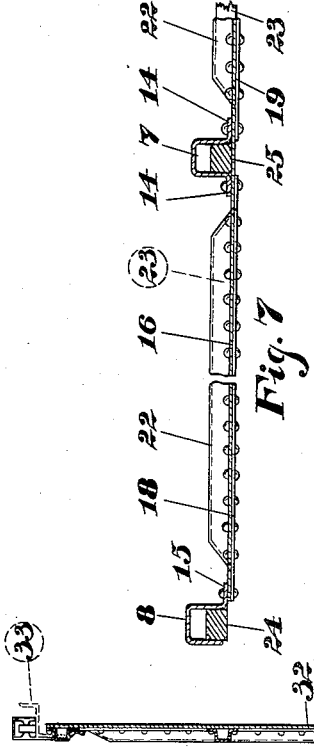
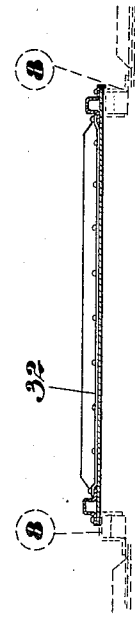
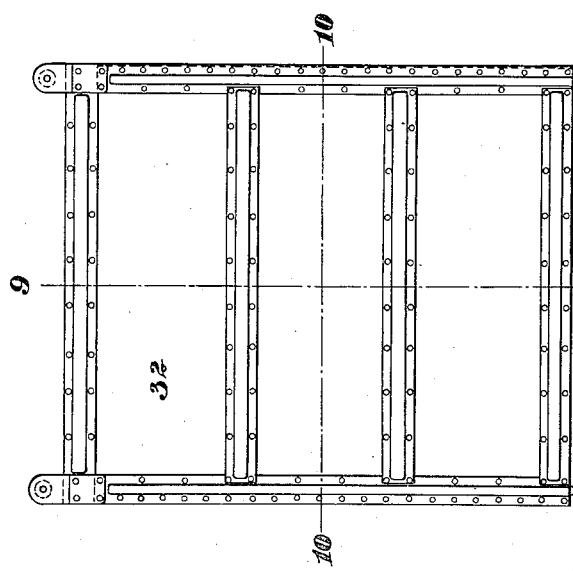

UNITED STATES PATENT OFFICE.

JOHN F. STREIB, OF AVALON, PENNSYLVANIA, ASSIGNOR TO PRESSED STEEL CAR COMPANY, OF PITTSBURGH, PENNSYLVANIA, A CORPORATION OF NEW JERSEY.

BOX-CAR CONSTRUCTION.

1,203,432.

Specification of Letters Patent.

Patented Oct. 31, 1916.

Application filed May 19, 1914. Serial No. 839,517.

*To all whom it may concern:*

Be it known that I, JOHN F. STREIB, a citizen of the United States, residing at No. 739 Taylor avenue, Avalon, in the county of Allegheny and State of Pennsylvania, have invented certain new and useful Improvements in Box-Car Construction, of which the following is a specification.

An object of the invention is to provide a metallic box car of simple, light and strong construction, which can be manufactured at a low cost, and which will also be very compact so that the car will have the maximum inside width as compared with its outside width.

Another object of the invention is to provide a box car having side wall plates which are strengthened and stiffened between the vertical posts of the upper-framing by integral pressed portions.

Another object of the invention is to provide the vertical posts and side wall plates of a metallic box car with recesses that are adapted to receive fillers which will not project beyond the inside surface of the side wall.

A further object of the invention is to provide a metallic car having posts and sheathing plates that are provided with fillers to which an inside lining may be secured, when a car having such lining is desired; or to which any suitable means may be secured for preventing the lading from shifting when the car is in transit.

These and other objects will be apparent from the following description.

Referring now to the drawings, in which like reference characters refer to like parts and in which—

Figure 2:
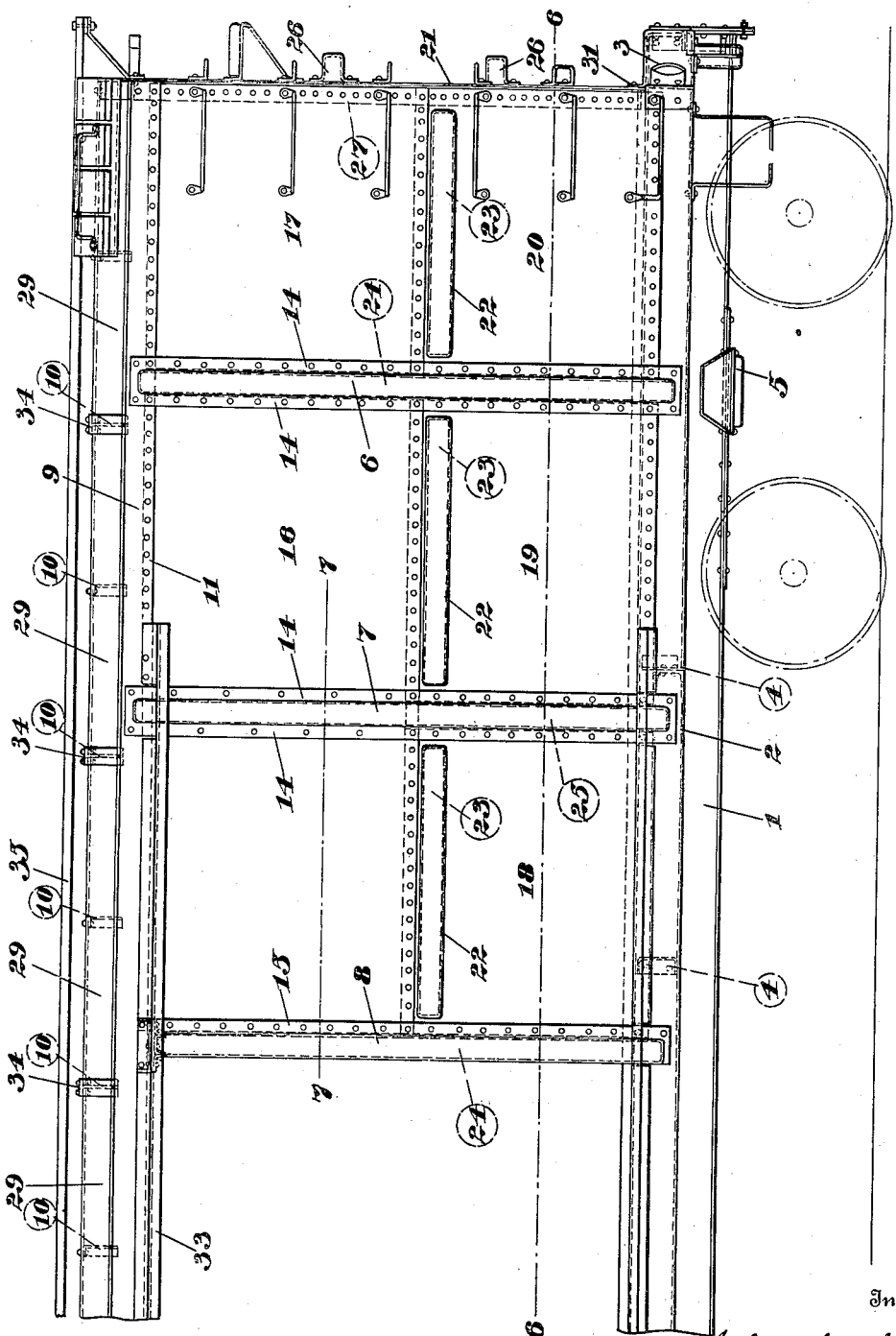
Figure 3:
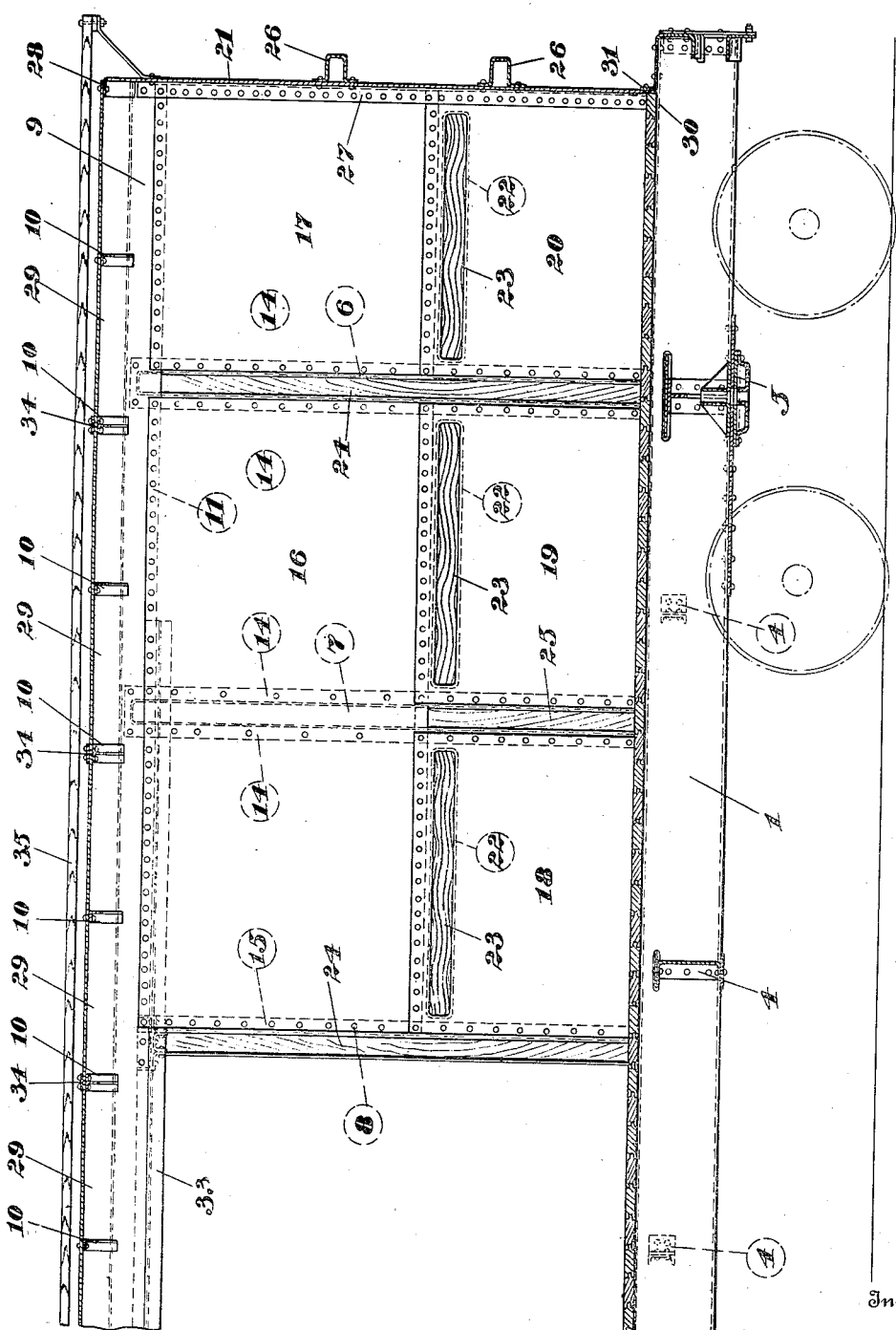
Figure 4:
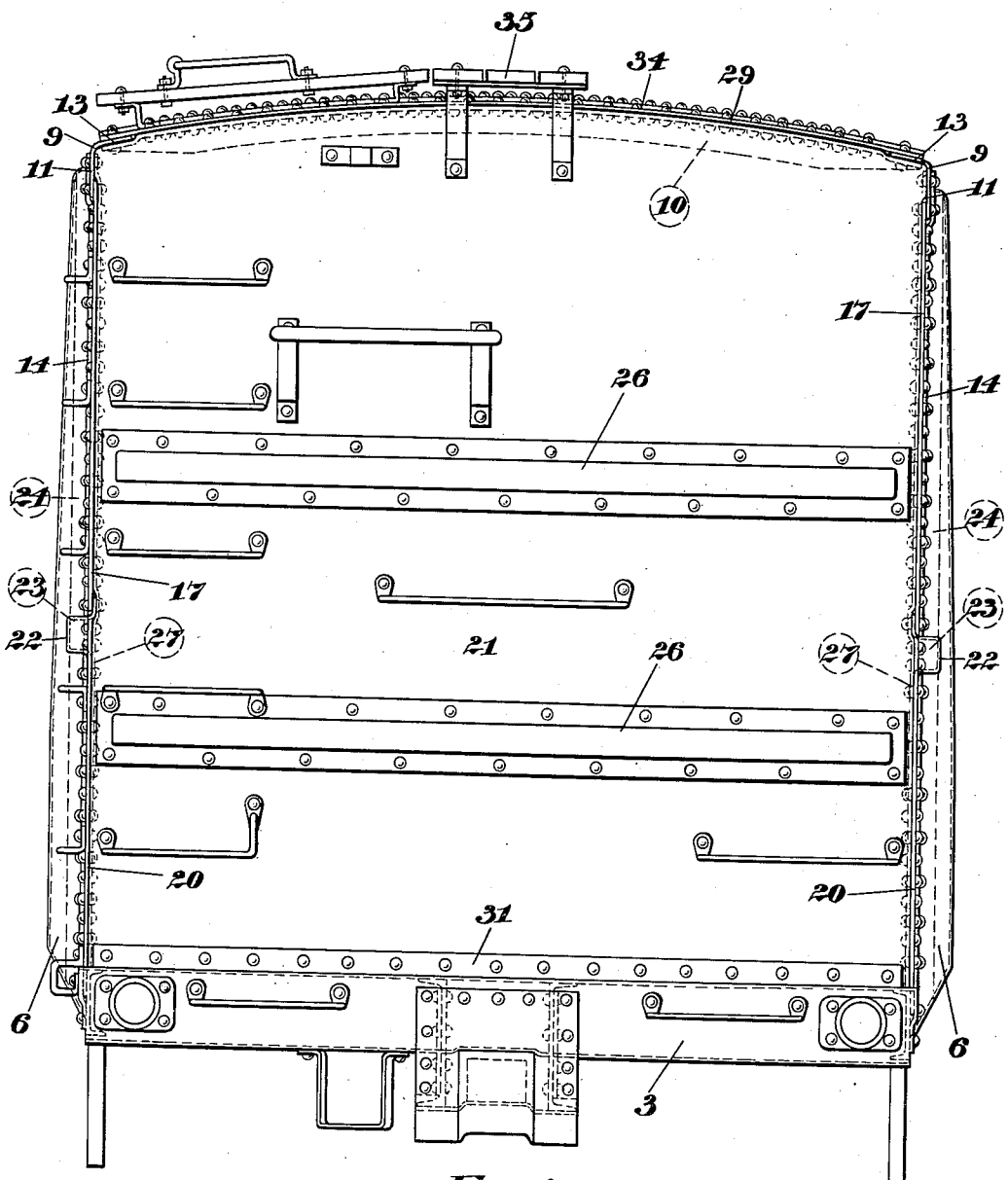
Figure 5:
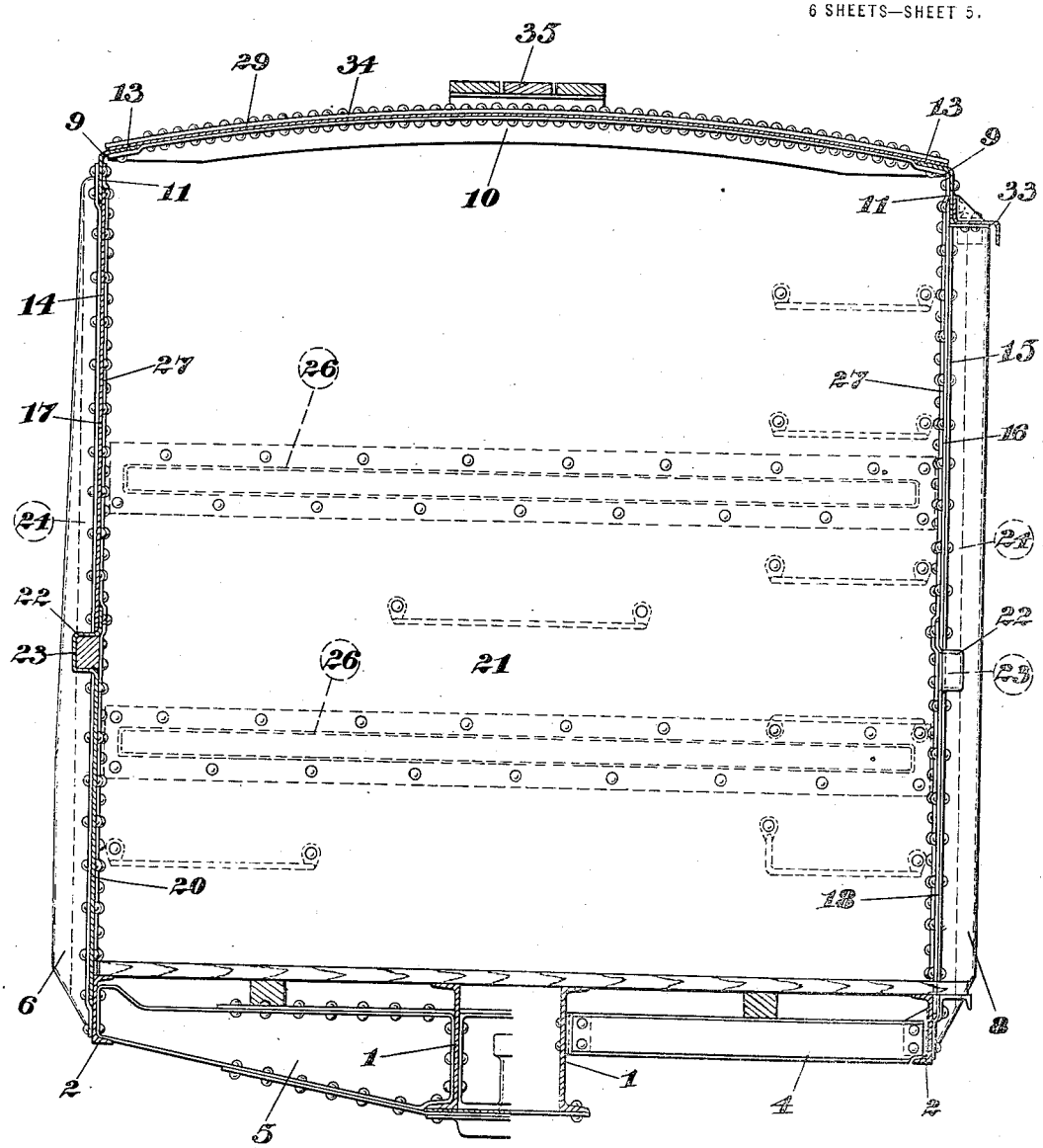

Figure 1 is a plan view of a portion of a car constructed in accordance with the invention; Fig. 2 is a side elevational view of the same; Fig. 3 is a longitudinal sectional view taken on the line 3—3 of Fig. 1; Fig. 4 is an enlarged end elevational view of the car; Fig. 5 is an enlarged cross sectional view taken on the line 5—5 of Fig. 1; Fig. 6 is a sectional view taken on the line 6—6 of Fig. 2; Fig. 7 is an enlarged sectional view taken on the line 7—7 of Fig. 2; Fig. 8 is a detail view of the side door and Figs. 9 and 10 are sectional views of the same taken on lines 9—9 and 10—10 respectively of Fig. 8.

The underframe may be of any suitable construction, and as an illustration an underframe has been embodied in the several figures of drawings which comprises center sills 1, side sills 2, end sills 3, transoms 4 and bolsters 5.

The upper-framing comprises side posts 6 and 7, side doors posts 8, side plates 9 and carlines 10. The upper portions of the posts 6, 7 and 8 are connected to the downwardly depending flanges 11 of the side plates 9, while the lower portions of such posts are connected to the side sills 2. The side plates 9 are preferably of angular form and preferably extend continuously for the full length of the car. To connect these side plates 9 together and to strengthen the upper-framing as a whole, carlines 10 of T or other suitable section are provided which are secured to the inwardly extending flanges 13 of the side plates 9. Each of the posts 6 and 7 comprises preferably a single metallic plate pressed to form a channel section having flanges 14, 14 projecting outwardly therefrom in opposite directions. The channel portions of these posts are preferably of varying depth, but it will be understood that a post may be used in which the channel portion is of equal depth throughout its length. Each of the posts 8 is formed in the same manner as the posts 6 and 7, but is only provided with a flange 15 on one of its edges. When the posts 6, 7 and 8 are secured in their proper positions, the hollow portions of the channel section face toward the interior of the car.

The side sheathing comprises upper plates 16 and 17 and lower plates 18, 19 and 20; the upper plates being adapted to overlap and be secured to the lower plates. Each of the upper plates 16 is preferably flat and may extend from the door post 8 to the side post 6. One end portion of this plate is secured to the flange 15 of the door post 8, while the other end portion is secured to one of the flanges 14 of the side post 6. Intermediate the posts 8 and 6 this plate is secured to the flanges 14, 14 of the post 7. Each of the upper plates 17 is preferably flat and is secured to one of the flanges 14 of the side post 6 and extends from such side post 6 to the end of the car where it may be connected with the end wall 21. The upper edge portions of both of these plates 16 and 17 overlap the flange 11 of the side plate 9 and are secured thereto by any suitable means. It will be seen that the upper portion of the side sheathing may be made of a greater number of plates than is shown in the drawings, or if desired, may be made of a single plate extending continuously from the door post to the end of the car. It will further be understood that the upper portion of the side sheathing may be provided with corrugations similar to those in the lower side plates as hereinafter described. Each of the lower plates 18, 19 and 20 preferably comprises a flat plate having a corrugation 22 formed therein at any desired location, but as shown in the drawings is preferably formed near the upper edge portion of the plate. This corrugation is preferably of substantially U shape in section and may extend for substantially the full width of the plate and is adapted to strengthen and stiffen such plate. In the drawings only one corrugation has been shown in each plate, but it will be seen that a number of corrugations may be provided if desired. To further stiffen and strengthen the side sheathing, the corrugation 22, in each of the plates 18, 19 and 20, may be provided with a filler 23 of wood, or any other suitable material, which filler may be secured within such corrugation by any suitable means. Each of the plates 18 is secured to the flange 15 of one of the door posts 8 and to one of the flanges 14 of the side post 7, and each of the plates 19 is secured to the other flange 14 of the side post 7, and to one of the flanges 14 of the side post 6, while the plate 20 is secured to the other flange 14 of the side post 6, and extends to the end of the car, where it may be connected with the end wall 21. Each of the plates 18, 19 and 20 overlap the side sill 2, and may be secured thereto by rivets or any other suitable means.

Each of the door posts 8, and each of the side posts 6 may be provided with a filler 24 which may be of wood or any other suitable material and which may extend for substantially the full height of the post. Each of the side posts 7 is provided with a filler 25 similar to filler 24 except that it is shorter, extending from a point below the floor to a point somewhat above the lower edge of the plate 17. These fillers 24 and 25 are secured within the hollow portions of the posts by any suitable means and are adapted to strengthen and stiffen such posts. It will be seen that if the upper portion of the side sheathing be made of three plates that the filler 25 may be made identical with the fillers 24, and if the upper portion of the side sheathing be made of a single continuous plate, that the fillers 24 may be made identical with the filler 25.

The fillers 23, 24 and 25 besides strengthening and stiffening the side wall of the car, provide members to which an interior lining may be secured, when a car having an inside lining is desired. These fillers also provide members to which any suitable means may be secured for preventing the lading from shifting during transit.

Each of the end walls 21 of the car preferably comprises a flat plate having transversely extending strengthening members 26 secured thereto. This end wall is provided with side flanges 27 to which the side sheathing plates 17 and 20, and the side plates 9 are connected, and is also provided with a top flange 28 to which the roof plates 29 are connected, and a bottom flange 30 which rests on the underframe and may be secured thereto if desired. Each of the end sills 3 are provided with an upwardly extending flange 31 to which the end wall 21 is secured.

The door 32 may be of any desired form suitably mounted on the door track 33 secured to the side plate 9.

The roof comprises a plurality of plates 29 which are secured to the carlines 10 and to the side plate 9, and at their adjacent edges are made weather-tight by the plate 34; 35 indicates the ordinary running board, which may be supported on the roof by any suitable means.

I do not wish to limit the invention to the exact construction shown in the drawings, for it will be apparent to those skilled in the art to which this invention appertains, that many minor changes may be made in the arrangement and details without departing from the spirit and scope of the invention, it being understood that the claims in this application are intended to cover only so much as is new and patentable over the subject matter claimed in a co-pending application filed April 9, 1914, by Charles A. Lindström, for box car, Serial No. 830,715.

Having thus described the invention, what I claim as new and desire to secure by Letters Patent is:

1. In a railway car the combination with an underframe, of an upper-framing secured to said underframe, said upper-framing comprising a plurality of posts, metallic sheathing secured to said posts, corrugations in said sheathing and fillers in said corrugations, each of said corrugations being of less length than the distance between adjacent posts.

2. In a railway car, the combination with an underframe, of a metallic upper-framing secured to said underframe, and side sheathing comprising upper and lower connected plates secured to said upper-framing, each of said lower plates having a corrugation in its upper edge portion and a filler in said corrugation, said corrugation terminating short of the edges of said plates.

3. In a railway car, the combination with the underframe, of a metallic upper-framing secured to said underframe, non-metallic fillers within the verticals of said upper-framing, and connected upper and lower plates secured to said verticals, said lower plates having corrugations extending in a direction longitudinally of the car and terminating short of said verticals.

4. In a railway car, the combination with an underframe, of side posts secured to said underframe, fillers in said posts, side sheathing secured to said posts, corrugations formed in said sheathing and fillers in said corrugations.

5. In a railway car, the combination with an underframe, of side posts secured to said underframe, non-metallic fillers within said posts, a sheathing plate secured to said posts, a corrugation formed in said plate and a non-metallic filler in said corrugation.

6. In a railway car, the combination with the underframe, of posts secured to said underframe, sheathing plates secured to said posts, and strengthening members mounted within said posts and plates, the strengthening members in said plates extending in a direction longitudinally of the car.

7. In a railway car, the combination with the underframe of posts secured to said underframe, sheathing plates secured to said posts, each of said plates having a corrugation terminating short of said posts and a filler in said corrugations.

8. In a railway car, the combination with the underframe, of an upper-framing connected therewith, upper and lower sheathing plates connected to said upper-framing, said lower plates being corrugated in a direction longitudinally of the car and fillers within the corrugations of said plates, said corrugations terminating short of the edges of said plates.

9. In a railway car, the combination with the underframe, of an upper-framing secured to said underframe, side sheathing comprising upper and lower plates secured to said upper-framing, said lower plates having integral corrugations of less length than the width of said plates, and fillers in said corrugations.

10. In a railway car, the combination with the underframe, of hollow metallic posts secured to said underframe, side sheathing secured to said posts, said side sheathing comprising upper and lower plates, and U-shaped corrugations formed in said lower plates, said corrugations terminating short of said posts.

11. In a railway car, the combination with the underframe, of side posts secured to said underframe, side plates connecting said posts, sheathing plates secured to said underframe, posts and side plates, said posts being of channel form in section, non-metallic fillers in said posts, corrugations in said sheathing plates terminating short of said posts, and fillers in said corrugations.

12. A side sheathing for railway cars comprising upper and lower metallic plates connected together, said upper plates being flat and said lower plates being corrugated, the corrugations in said plates having integral closed ends.

13. In a wall structure for railway cars, the combination with framing comprising vertical posts, of sheet metal wall elements secured to said posts, said elements having integral corrugations terminating short of said posts, and fillers in said corrugations.

14. In a wall structure for railway cars, the combination with upper-framing comprising a plurality of posts, of flat upper plates and corrugated lower plates secured to said upper framing, means for securing said upper and lower plates together, and strengthening members within the corrugations of said lower plates, said corrugations and strengthening members terminating short of said posts.

15. In a wall structure for railway cars, the combination with upper-framing comprising a plurality of posts, of corrugated sheathing secured to said posts, and fillers secured in said upper-framing and sheathing, the fillers in said sheathing extending in a direction longitudinally of the car.

16. In a wall structure for railway cars, the combination with vertical posts, of a sheathing plate secured to said posts, said plate having an integral corrugation substantially as long as the distance between said posts and having integral closed ends, and a filler in said corrugation.

17. In a wall structure for railway cars, the combination with vertical posts, of a sheathing plate secured to said posts, a corrugation in said sheathing plate extending in a direction longitudinally of the car, and means in said corrugation adapted to strengthen and stiffen said plate, said corrugation terminating short of said posts.

18. In a wall structure for railway cars, the combination with vertical posts of corrugated sheathing plates secured to said posts, the corrugations in said plates terminating short of said posts and forming in effect a substantially continuous longitudinal member from the door opening to the end of the car, and fillers within said corrugations.

19. In a wall structure for railway cars, the combination with the upper-framing, of corrugated sheathing secured to said upper-framing, and fillers wholly within the corrugations in said sheathing, and within the vertical plane of the inner surface of said sheathing.

20. In a wall structure for railway cars, the combination with hollow upper-framing, of sheathing plates secured to said upper-framing, said plates being provided with corrugations which extend in a direction longitudinally of the car and fillers within said corrugations and said upper-framing.

21. In a wall structure for railway cars, the combination with a channel shape post, of an upper sheathing plate adapted to close the hollow portion of said post for a portion of its length and a filler adapted to close said hollow portion for the remainder of its length.

22. In a wall structure for railway cars, the combination with a hollow post, of a sheathing plate adapted to close the hollow portion of said post for a part of its length, and a filler adapted to close said hollow portion for the remainder of its length.

23. In a wall structure for railway cars, the combination with a hollow post, of a sheathing plate adapted to close the hollow portion of said post for a part of its length, a filler adapted to close the hollow portion of said post for the remainder of its length, corrugated sheathing plates secured to said posts below the first mentioned plates, and means for securing said plates together.

24. In a wall structure for railway cars, the combination with a plurality of posts, of a sheathing plate secured to said posts and a corrugation formed in said plate and terminating short of said posts, and fillers in said corrugation and posts.

25. In a wall structure for railway cars, the combination with a plurality of posts, of a sheathing plate secured to said posts, a corrugation formed in said plate, and a filler secured wholly within said corrugation, and within the vertical plane of the inner surface of said plate.

26. In a wall structure for railway cars, the combination with a post, of a sheathing plate secured to said post, and fillers wholly within said post and sheathing plate, the filler in said post extending in a vertical direction and the filler in said plate extending in a horizontal direction.

27. A sheathing plate having a corrugation extending substantially across its width and a filler wholly within said corrugation, and within the vertical plane of the inner surface of said plate.

28. A sheathing plate having a channel shape corrugation extending substantially across its width and a filler wholly within said corrugation, and within the vertical plane of the inner surface of said plate.

29. In a wall structure for railway cars, the combination with the upper-framing, of corrugated sheathing plates secured to said upper-framing, the corrugations in said plates terminating short of the edges thereof and forming in effect a continuous longitudinal member from the door opening to the end of the car.

30. In a wall structure for railway cars, the combination with the upper-framing, of an upper sheathing plate secured to said upper-framing, and a plurality of lower corrugated sheathing plates secured to said upper plate and to said framing, the corrugations in said plates terminating short of the members forming said upper-framing.

31. In a railway car, a side sill, a side plate, posts connecting said sill and plate, sheathing comprising a plurality of plates connected with said posts, side plate and side sill, corrugations formed in said sheathing intermediate said side plate and side sill, and fillers in said corrugations, said corrugations terminating short of said posts.

32. In a railway car, the combination with the underframe, of a plurality of posts connected with said underframe, connected upper and lower sheathing plates secured to said posts, and an integral corrugation formed in one of said plates adapted to strengthen said plates, said corrugations having integral closed ends.

33. In a wall structure for railway cars, the combination with hollow posts having edge flanges, of sheathing plates secured to said flanges and terminating short of the hollow portions of said posts, and fillers adapted to close the hollow portions of said posts between said plates.

34. In a wall structure for railway cars, the combination with recessed posts, of flanges on said posts, recessed sheathing plates secured to said flanges and terminating short of the recesses in said posts, fillers closing the recesses in said posts between said plates, and fillers closing the recesses in said plates.

35. In a car, a longitudinally disposed sheathing plate having a corrugation formed therein of less length than said plate, and a filler in said corrugation.

In testimony whereof I affix my signature in presence of two witnesses.

JOHN F. STREIB.

Witnesses:
 FRANK E. MILLER,
 MARGARET SUMMERBELL.